United States Patent [19]
Feit et al.

[11] 3,789,159

[45] Jan. 29, 1974

[54] ARRANGEMENT FOR SYNCHRONIZING THE RECORDING OF A PLURALITY OF SIGNALS ON A RECORDING MEDIUM

[75] Inventors: Louis Feit, Fair Lawn; Irving A. Krause, Nutley, both of N.J.

[73] Assignee: International Telephone and Telegraph Corporation, Nutley, N.J.

[22] Filed: May 23, 1972

[21] Appl. No.: 256,033

[52] U.S. Cl. ...179/100.2 S, 128/2.06 A, 179/100.2 B, 179/100.2 E

[51] Int. Cl. ........................ G11b 5/86, G11b 15/18

[58] Field of Search 179/100.2 B, 100.2 E, 100.2 S; 318/314, 318; 128/2.06 A, 2.06 G, 2.06 V

[56] References Cited

UNITED STATES PATENTS 3,230,307 1/1966 Bounsall .............................. 178/6.6

3,441,342 4/1969 Ball et al. ..................... 179/100.2 S

OTHER PUBLICATIONS

Tall, Techniques of Magnetic Recording, MacMillan Co., New York, 1958, page 211 lines 11–26

*Primary Examiner*—Vincent P. Canney
*Assistant Examiner*—Robert S. Tupper
*Attorney, Agent, or Firm*—C. Cornell Remsen, Jr. et al.

[57] ABSTRACT

An arrangement for synchronized recording is described for recording of a plurality of aural sounds in a predetermined time relationship. The arrangement includes a master tape player and a plurality of slave tape players which are controlled by a synchronizer so that they are individually advanced or retarded in accordance with a synchronizing signal from the master player. This enables the production of a single tape with each desired aural sounds on one of the multiple tracks of the tape in proper synchronized relationship.

12 Claims, 5 Drawing Figures

AN ARRANGEMENT FOR SYNCHRONIZING THE RECORDING OF A PLURALITY OF SIGNALS ON A RECORDING MEDIUM

CROSS REFERENCE TO RELATED APPLICATIONS

This application is related to application Ser. No. 92,788, now U.S. Pat. No. 3,665,087, filed Nov. 25, 1970, and entitled A Manikin Audio System; and to application Ser. No. 221,902, filed Jan. 31, 1972, and entitled A Manikin Synchronization System. The assignee of these referenced applications is the same as in the present application.

BACKGROUND OF THE INVENTION

In general this invention relates to an arrangement for synchronized recording of a plurality of signals in predetermined relationship, and more particularly to an arrangement for synchronizing a plurality of aural sounds within a predetermined synchronizing cycle.

As described in the cross referenced applications, in order to provide a realistic teaching system for mechanical and acoustic simulation of a large number of heart ailments, the mechanical simulation of the manikin must duplicate the breathing and movements of major veins, arteries and motions with the chest heart sounds for each ailment. Each ailment or disease is simulated by an audio tape arrangement which is driven in synchronism with the mechanical action. The audio tape arrangement consists of a sound reproducing system which will produce four distinct sounds for each heart ailment selected. The proper heart sound corresponds to the classical chest areas being examined by the operator. Since each disease requires four different heart sounds on a single magnetic tape with the necessary timing signals applied to the tape, in order that the sound is in coincidence with the mechanical motions, an arrangement is required for making each individual sound tape for each distinct heart ailment and for combining each of the distinct heart sounds of one ailment on a single tape in proper synchronization. As can be readily appreciated by anyone skilled in the art of tape recorders, or other such recording means, to provide an accurate relationship between individual signals and an overall synchronizing signal requires accurate timing and properly synchronized equipment to a degree which cannot be readily accomplished without special apparatus. The arrangement of the present invention therefore is directed to solving these problems by providing means for recording each individual heart sound with proper synchronization, and by combining these recorded sounds on a single recording medium. Insofar as the descriptions in the cross referenced applications are necessary to complete this disclosure, they are incorporated by reference herein.

SUMMARY OF THE INVENTION

It is therefore an object of the present invention to provide an improved arrangement for synchronized recording.

Another object of this invention is to provide an arrangement for synchronized recording on which a plurality of signals are recorded in a predetermined manner.

According to the broader aspects of the invention an arrangement for synchronized recording is provided in which a first means produces a first signal and a synchronization signal, a second means produces a second signal and another synchronization signal, and in which control means is coupled to said first and second means to control, in response to said synchronizing signal, said second means such that the recording of said first and second signals are in a predetermined relationship.

A feature of the invention is to provide an arrangement for recording in which a sound generator produces a sound to be recorded and another signal, and in which means responsive to said signal causes a synchronizing signal to be recorded in a predetermined recurrent cycle with respect to said sound.

BRIEF DESCRIPTION OF THE DRAWINGS

The foregoing and other objects and features of the invention will best be understood by reading the following description in connection with the drawings, in which.

DESCRIPTION OF THE PREFERRED EMBODIMENT

Figure 1:
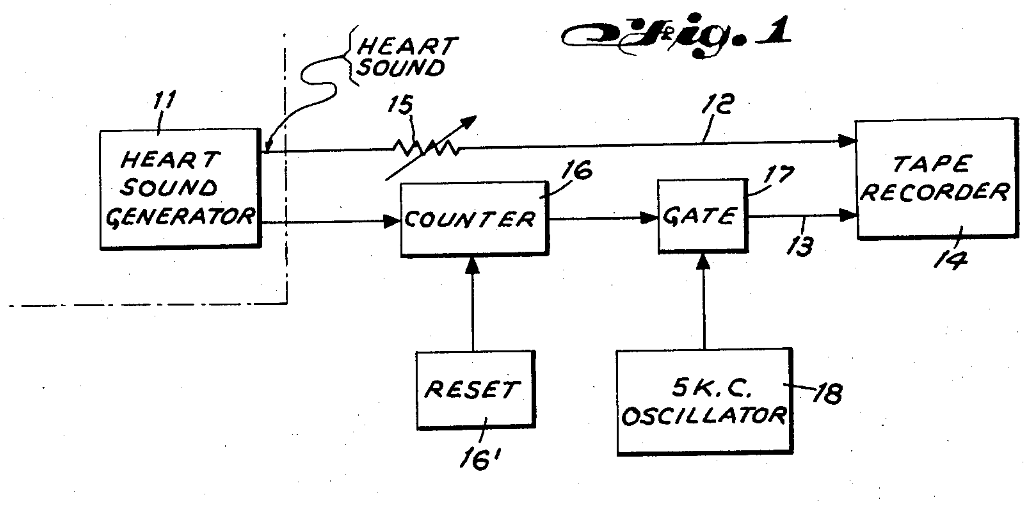
FIG. 1 is a block diagram illustrating an arrangement for producing a tape recording.

As described above, each disease requires four different heart sounds to be recorded on a single magnetic tape with the necessary synchronization on the single tape. In order for proper differentiation between the different ailments, each of the four heart sounds must be recorded in a predetermined and synchronized relationship with each other on a single four-track magnetic tape. Referring now to FIG. 1, there is illustrated the arrangement for making the individual magnetic tapes for each of the four heart sounds, together with the addition of the synchronizing signal, to be placed on one of the two tracks of the tape. Each tape to be produced according to the arrangement of FIG. 1 will include one track containing one of the four heart sounds of one disease and a synchronization signal representing a breathing cycle for a predetermined number of heartbeats. Since it requires four such tapes to completely represent one heart disease, it is evident that to provide a heart disease library will require a multitude of four-track audio tapes which have been properly synchronized during production.

In FIG. 1 there is provided a heart sound generator 11 of standard design which is coupled by tracks 12 and 13 to a standard two-track magnetic tape recorder 14. The heart sounds from the heart sound generator are coupled through a variable resistive element 15 to one recording head of the tape recorder. The heart sound generator additionally produces, along track 13, an ECG (electrocardiogram) pulse, one pulse for each heart sound. This pulse is coupled through a five-to-one counter 16 having a manual reset feature 16', which enables the recording operator to set the beginning of a desired breathing cycle start pulse. The five-to-one ratio counter has been medically established by virtue of the desired breathing cycle and heart sound ratio desired. Every fifth pulse activates gate 17 to enable a 5 KC output from oscillator 18, to be recorded on a second magnetic track of recorder 14. An embodiment for recording this synchronizing pulse on track 2 of FIG. 1 is illustrated in FIG. 2.

Figure 2:
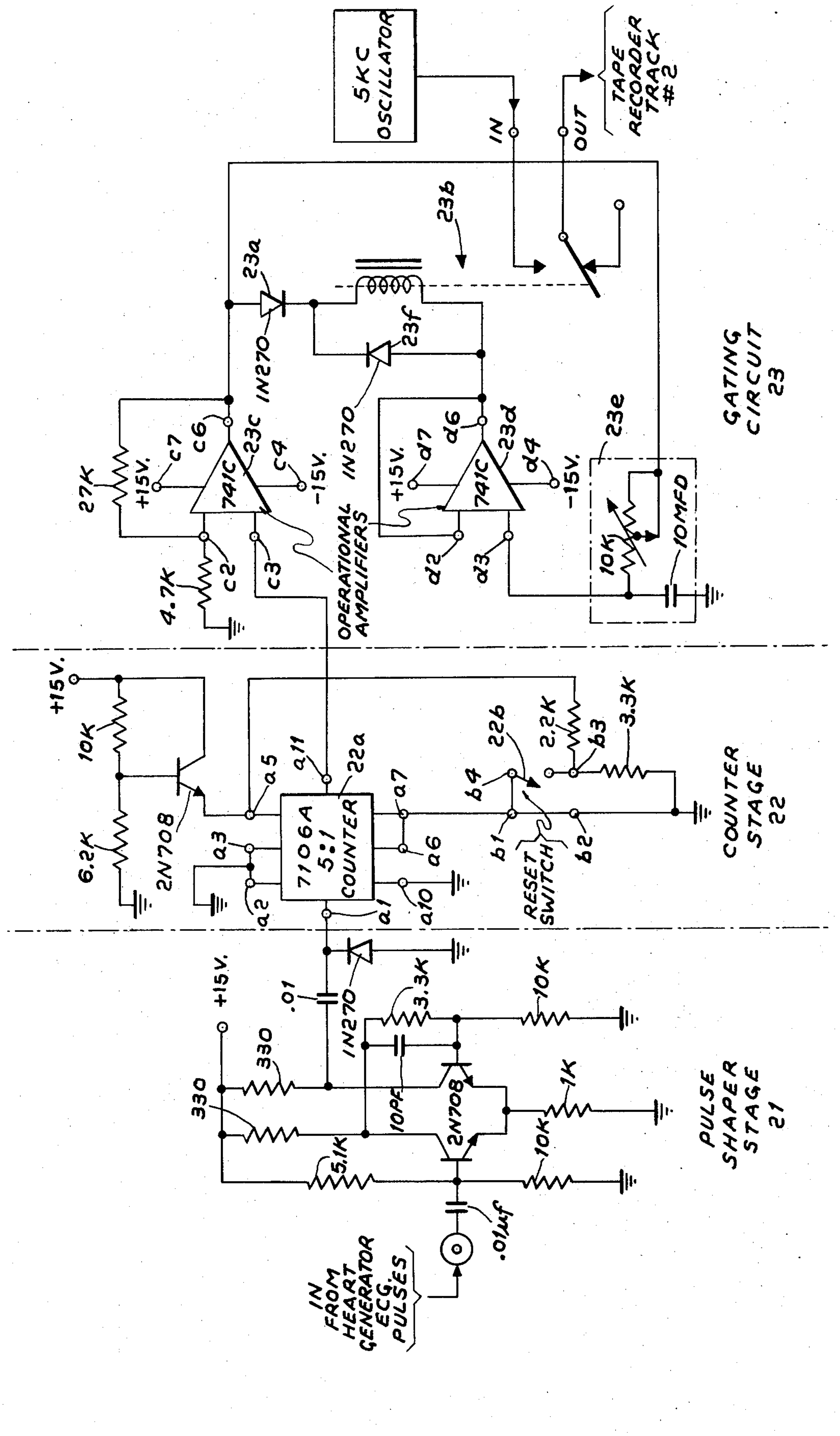
FIG. 2 further details portions of the block diagram illustrated in FIG. 1.

Referring now to FIG. 2, the arrangement receives the ECG pulses from the heart generator, and couples them to a five-to-one counter stage 22 that is preceded by a pulse shaping stage 21 comprising a transistorized Schmidt trigger arrangement. The counter stage 22 comprising the five-to-one counter 22*a* and has coupled thereto a manual reset switch 22*b* for initiating the five-to-one count at a desired time to represent the start of a breathing cycle. The output pulse at terminal all of counter 22*a* is coupled to the operational amplifiers 23*c* and 23*d* of gating circuit 23. As the output of amplifier 23*c* becomes positive, diode 23*a* is forward biased energizing the coil of relay 23*b*, the relay contacts switch from the shown position to the opposite terminal position, thereby permitting the 5 KC signal from the oscillator to be coupled out and recorded. At the same time, the output signal from amplifier 23*c* is coupled to the pulse duration control 23*e* which provides a predetermined time constant to turn amplifier 23*d* on and forward bias diode 23*f*. This shorts the voltage across the coil of relay 23*b* and returns its contact to the shown position. This gating circuit permits the 5 KC synchronization pulse to be applied to the second track of the tape for any desired period of time as set by the RC circuit 23*e*. The biasing and operation of the remaining components comprising the arrangement illustrated in FIG. 2 should be evident to one skilled in the art.

Since each disease requires one tape with four heart sounds and a synchronizing signal properly recorded in a predetermined manner, four individual tapes produced according to FIG. 1 must be meshed on one four-track tape which will then serve as the reference tape for a particular heart disease. Each track of the tape, as described in the referenced applications, indicates specific portions of the heart under auscultation. The arrangement in FIG. 3 shows a preferred embodiment for providing a four-track tape recording for utilization in a system such as described in the referenced applications.

Figure 3:
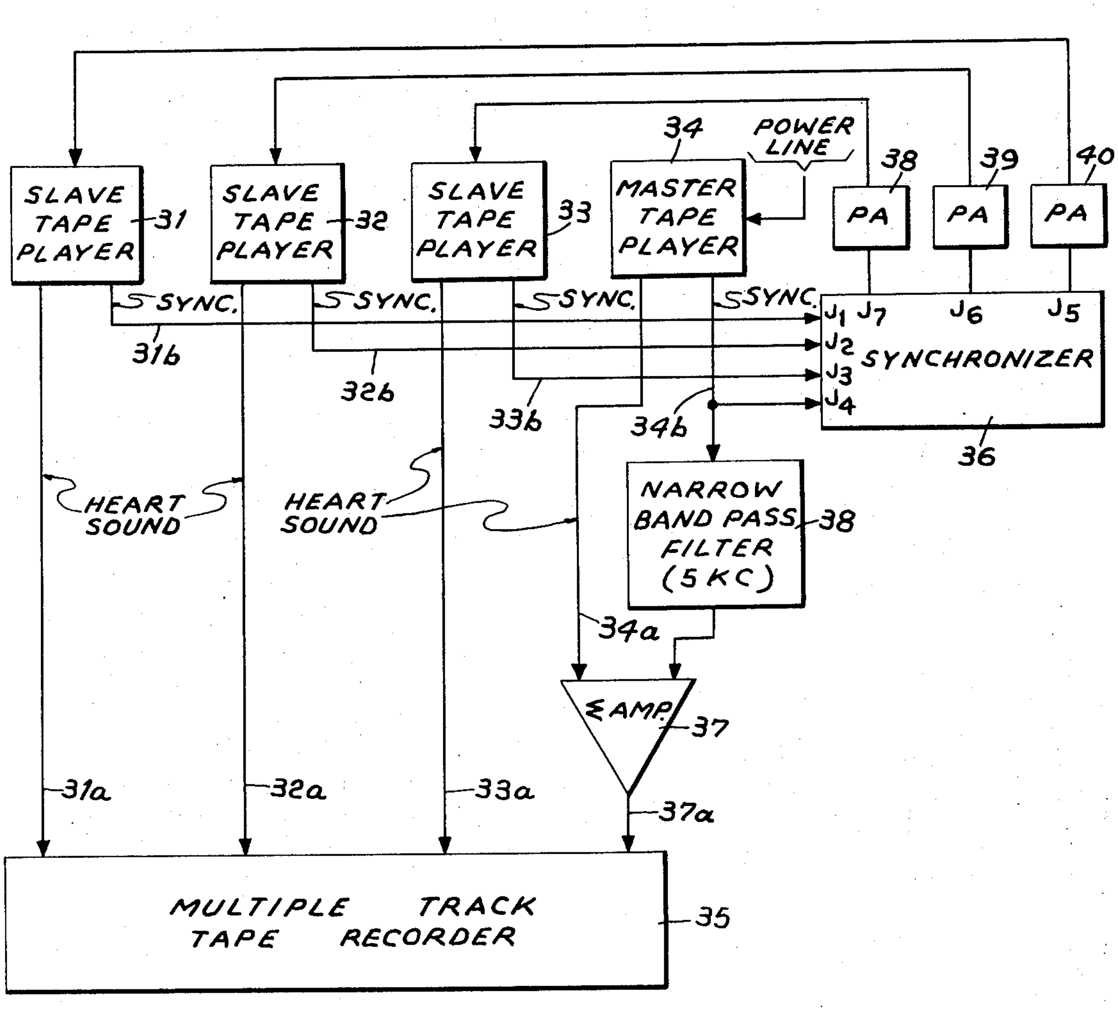
FIG. 3 is a block diagram showing an arrangement for producing a single tape recording using a plurality of tape produced according to FIG. 1.

Referring now to FIG. 3, the arrangement illustrated comprises three slave magnetic tape players 31, 32 and 33 and a master magnetic tape player 34 coupled to a power line. For the purposes of this enabling embodiment, tape player 34 has been selected as the master player and tape players 31–33 as the slaves. Of course, it should be readily understood that any one of the four tape players may be used as a master provided it is connected as illustrated and described in connection with FIGS. 3 and 4. A four-track magnetic tape recorder 35 is directly coupled to receive the heart sound signals via lines 31*a*, 32*a* and 33*a*. Each synchronization signal from the slave tape players is respectively coupled by lines 31*b*, 32*b* and 33*b* to terminals J1, J2 and J3 of a master synchronizer 36 which is described in greater detail in connection with FIG. 4. The master player 34 has its heart sound signal 34*a* coupled to one input of a summing amplifier 37. The synchronization signal 34*b* from the master player is coupled to the J4 terminal and through a narrow passband filter 38 to the other input of amplifier 37. Since the summing amplifier 37 will provide an output at 37*a* which contains both the synchronization signal and the heart sound signal, a narrow bandpass filter is utilized to prevent contamination of the heart signal by the 5 KC synchronization signal when recorded on a single track of recorder 35.

The master player will be operated from a standard 60 Hz frequency power line. However, the synchronous motors of the slave amplifiers will be controlled by the master synchronizer whose outputs J5, J6, J7 are coupled through power amplifiers 38, 39 and 40 to the synchronous motor inputs of each of the slave players to insure recording of the signals on each track in a predetermined relation.

Figure 4A:
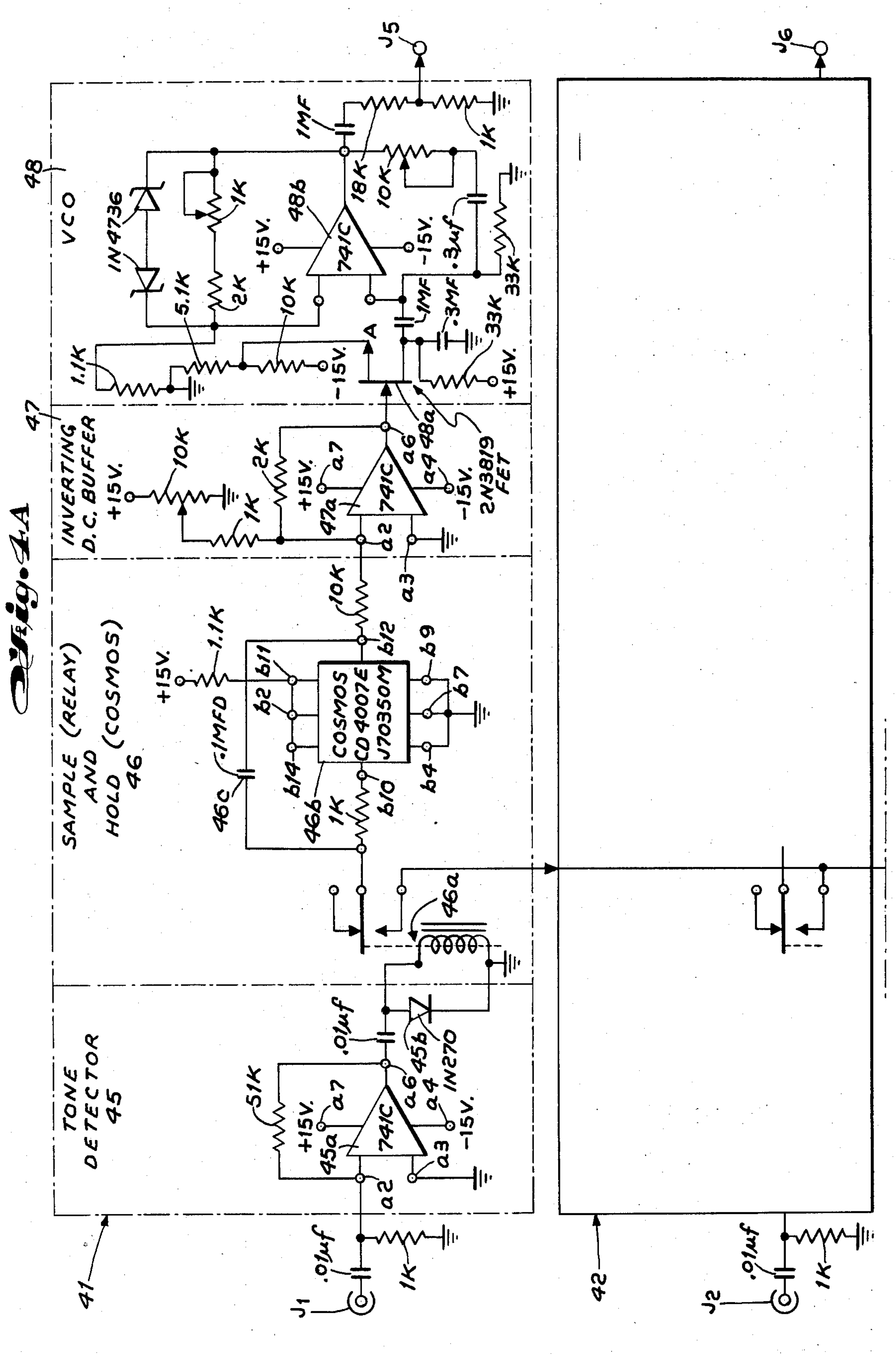
FIGS. 4*a* and 4*b* illustrate the synchronizer shown in FIG. 3 in greater detail.
Figure 4B:
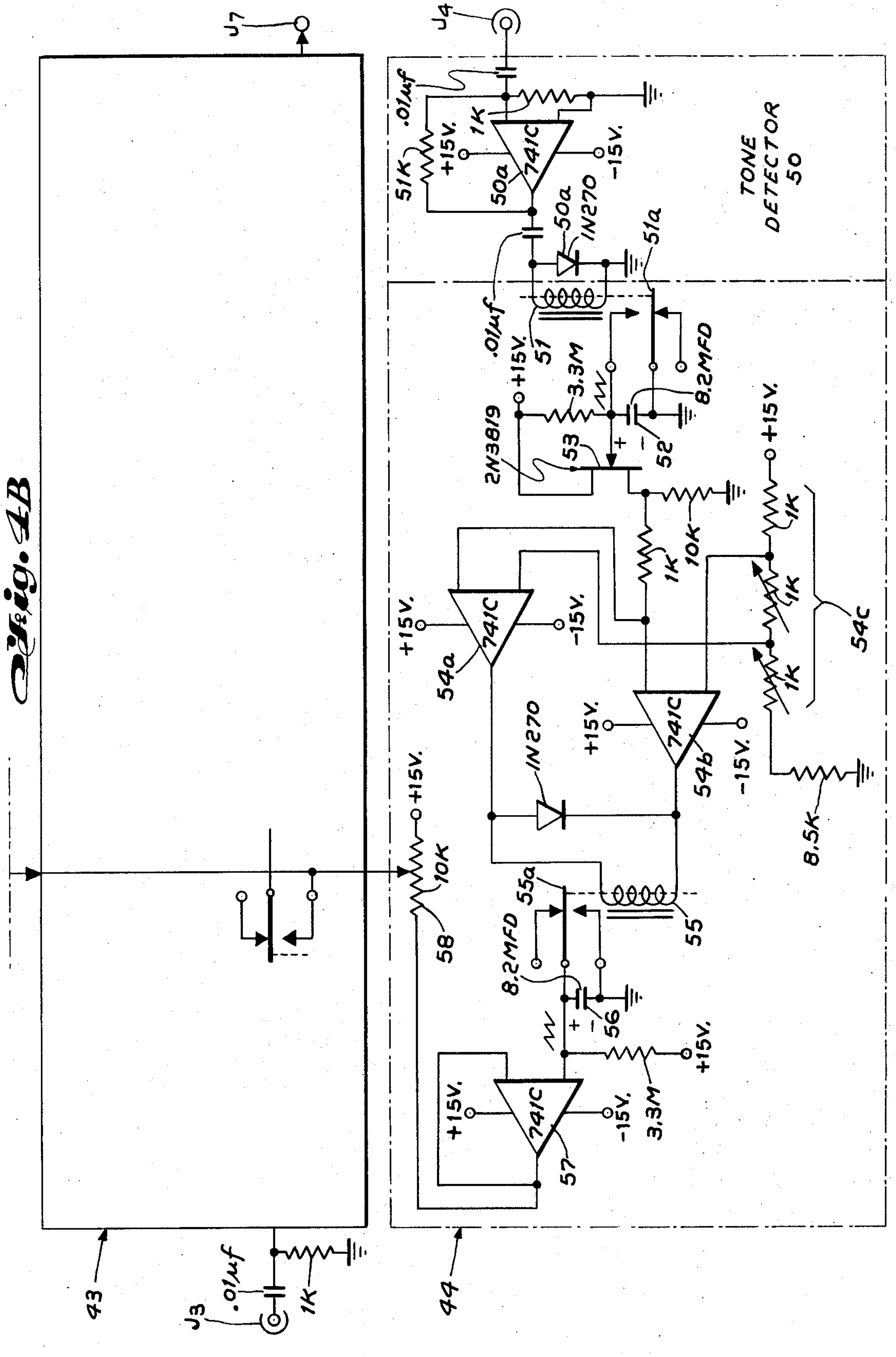

An enabling embodiment for the master synchronizer 36 is illustrated in FIGS. 4*a* and 4*b*, and comprises the following components. A synchronizing block 41 and input J1 and output J5, a synchronizing block 42 which is a duplicate of block 41 with input J2 and output J6, and a synchronizing block 43 is also a duplicate of blocks 41 and 42 with input J3 and an output J7. Synchronizing block 44 is the portion of the synchronizer 36 that is designated as the master and has an input J4 from the master tape player and its output voltage at resistor 58 is used by the synchronizing blocks 41, 42 and 43 to synchronize their respective outputs J5, J6 and J7.

It should be understood that the following description of operation of synchronizing block 41 also holds true for the operation of blocks 42 and 43, and in addition, the circuit operation is similar to that described in connection with the cross referenced application Serial No. 221,902 with certain exceptions will be evident to those skilled in the art. The synchronizing block 41 comprises a tone detector circuit 45 coupled to a sample and hold circuit 46, followed by an inverting DC buffer circuit arrangement 47 and a voltage controlled oscillator circuit 48. When the synchronizing tone signal 31*b* from slave player 21 is coupled to the J1 input, it is amplified by amplifier 45*a* and detected by diode 45*b*. This output causes the voltage at resistor 58 to be sampled by the relay 46*a* and held by the combination of cosmos device 46*b* and capacitor 46*c*. The sampled and stored voltage is then coupled to the DC inverting buffer and summing amplifier 47*a*. The output voltage at point *a*6 of amplifier 47*a* controls the bias on the FET 48*a* which is coupled to the following voltage controlled oscillator circuit 48. The VCO circuit, with the component parameters illustrated, nominally produces a 60 Hz output; however, according to the bias voltage coupled from amplifier 47*a* to the FET, the FET resistance will vary, and the oscillator frequency output will change in proportion to the resistance variation caused by the biasing voltage. This enables synchronizing block 41 to synchronize to the master synchronizing block 44, so that the output J5 which controls the synchronous motor of player 31 will be locked to the speed of the master tape player.

Referring now to block 44, the J4 input synchronizing signal is coupled to the tone detector circuit portion 50 including amplifier 50*a* and diode detector 50*b*. The detected tone signal causes contacts 51*a* of relay 51 to momentarily close and start the generation of a ramp function voltage across capacitor 52. A source follower FET 53 is coupled to a following operational amplifier arrangement comprising amplifiers 54*a* and 54*b*. Adjusting resistance 54*c* of the operational amplifier 54, enables closing of the contacts 55*a* at the midpoint of the voltage developed across capacitor 52. The momentary closing of the contacts 55*a* starts another ramp function voltage across capacitor 56. This output voltage is coupled to the voltage follower amplifier 57 and appears across the output variable resistor 58 of the synchronizing block 44. The start of the second ramp voltage is designed to begin at the midpoint of the first ramp voltage. When the voltage is sampled by the synchronizing blocks 41, 42 and 43, the desired proportional output frequency at outputs J5, J6 and J7 is obtained to control and lock the speed of the synchronous motors in the slave tape players 31, 32 and 33 to that of the master player.

The synchronizer 36, as set out in FIG. 4, provides for the synchronizing of all the synchronizing signals on lines 31*b*, 32*b*, and 33*b* of FIG. 3 with the synchronizing signal on line 34*b*. With each of the individual slave players in proper synchronism with the master tape player, a single four-track tape can now be produced having the four heart sounds, representing one heart disease recorded in proper predetermined synchronism with every other sound, and with one of the heart sounds containing a synchronizing pulse timed to the mechanical operation of the manikin as disclosed in the cross referenced application Serial No. 221,902.

While we have described above the principles of our invention in connection with specific apparatus, it is to be clearly understood that this description is made only by way of example and not as a limitation to the scope of our invention as set forth in the objects thereof and in the accompanying claims.

We claim:

1. An arrangmement for recording a plurality of signals on a multiple track magnetic tape comprising:

a master tape player means producing first and second signals, said second signal being a first synchronizing signal;

a plurality of slave tape player means, each of said slave tape player means being driven by a speed controllable motor and each of said slave tape player means producing third and fourth signals, said fourth signal being a second synchronizing signal; and means coupled to said master and slave tape player means for recording said first and second signals in one track, and each of said third signals in respective separate tracks of said tape;

synchronizing means coupled to receive said first and second synchronizing signals, said synchronizing means producing a plurality of control signals, each of said control signals being produced by sampling, in response to an associated one of said fourth signals, the amplitude of a reference voltage produced in response to said second signal, each of said control signals controlling the speed of an associated one of said slave tape players through the associated one of said controllable motors so that said first, second, and third signals are recorded on said tape in a predetermined synchronized manner.

2. The arrangement according to claim 1 including a multiple track tape recorder coupled to receive said first and second signals from said master tape player, and coupled to receive said third signal from each of said plurality of slave tape players.

3. The arrangement according to claim 2 including a narrow bandpass filter and a summing amplifier coupled between said master tape player means and said multiple track recorder to cause said first and second signals to be recorded on a single track of said tape.

4. The arrangement according to claim 1 wherein said synchronizing means includes a plurality of synchronizing circuits, one of said plurality of circuits coupled to receive said second signal and each of the other of said plurality of circuits coupled to receive a fourth signal from each of said plurality of slave tape players.

5. The arrangement according to claim 4 wherein each of said other synchronizing circuits produces one of said control signals whose frequency is dependent on said reference voltage output produced by said one synchronizing circuit.

6. The arrangement according to claim 5 wherein said control signals of said other circuits are each coupled by a power amplifier to control the speed of associate ones of said controllable motors.

7. The arrangement according to claim 5 wherein each of the other of said synchronizing circuits includes:

a tone detector means;

a sample and hold means coupled to said tone detector means; and an inverting DC buffer means coupled to said sample and hold means to control a following voltage controlled oscillator to produce said control signal, the output frequency of said voltage controlled oscillator being dependent on the amplitude of said reference voltage from said one synchronizing circuit which is sampled and held by said sample and hold means.

8. The arrangment according to claim 4 wherein said one synchronizing circuit includes:

means for producing a first ramp voltage representing a first timing cycle;

a source follower to couple said first ramp voltage to a following operational amplifier;

means coupled to said operational amplifier for producing a second ramp voltage representing a predetermined timing cycle in relation to said first ramp voltage; and voltage follower means coupled to produce said reference voltage porportional to said other ramp voltage.

9. An arrangement for recording a plurality of signals on a multiple track recording means comprising:

a first means producing first and second signals, said second signal being a first synchronizing signal;

a plurality of slave means, each of said slave means being driven by a speed controlled motor and each of said slave means producing third and fourth signals, said fourth signal being a second synchronizing signal; and means coupled to said first and slave means for recording said first and second signals in one track, and each of said third signals in respective separate tracks of said recording means;

synchronizing means coupled to receive said first and second synchronizing signals, said synchronizing means producing a pluraltity of control signals, each of said control signals being produced by sampling, in response to an associated one of said fourth signals, the amplitude of a reference voltage produced in response to said second signal, each of said control signals controlling the speed of an associated one of said slave means through the associated one of said controlled motors so that said first, second, and third signals are recorded on said recording means in a predetermined synchronized manner.

10. The arrangement according to claim 9 wherein said synchronizing means includes a plurality of synchronizing circuits, one of said plurality of circuits coupled to receive said second signal and each of the other of said plurality of circuits coupled to receive a fourth signal from each of said plurality of slave means.

11. An arrangement for producing a recording on a tape comprising:

first means for producing a first signal representing a first heart sound and a first synchronizing signal representing a breathing cycle;

second means being driven by a speed controlled motor for producing a second signal representng a second heart sound and a second synchronizing signal representing said breathing cycle; and third means coupled to said first and second means for rcording said first and second heart sounds on said tape;

fourth means coupled to said first and second means and to said speed control means, said fourth means producing a control signal for said motor, said control signal being produced by sampling, in response to said second synchronizing signal, the amplitude of a reference voltage produced in response to said first synchronizing signal, said control signal controlling the speed of said motor whereby said recording of said first and second heart sounds is effected in a predetermined synchronized manner in relation to said first and second synchronizing signals.

12. An arrangement for producing a recording on a magnetic tape comprising:

A heart sound generator for producing first and second heart sound signals;

A magnetic tape recorder means having a first recording track and a second recording track, said recorder means being coupled to said generator for recording said first signal on said first track;

A source of a third signal; and synchronizing means including counter means coupled to said generator and gating means coupled to said counter and source, said counter being responsive to a predetermined number of second signals from said generator to activate said gating circuit to cause said third signal to be recorded on said second track for a predetermined time, in a predetermined synchronized relation with respect to said first signal.

* * * * *